3,052,671
PYRAZOLINO PREGNENE COMPOUNDS AND
METHODS FOR THEIR PRODUCTION
Eugene L. Wittle, Ann Arbor, Mich., and James A. Moore, Newark, Del., assignors to Parke, Davis & Company, Detroit, Mich., a corporation of Michigan
No Drawing. Filed Apr. 10, 1961, Ser. No. 101,685
8 Claims. (Cl. 260—239.5)

This invention relates to compounds of the pregnene series. More particularly it relates to 16α,17α,21-[3,1,1-(2-pyrazolino)]-pregnen-20-one compounds which can be represented by the formula

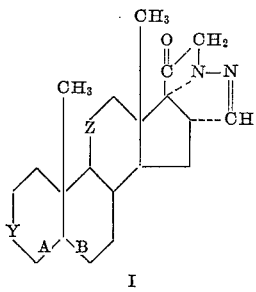

I and to methods for their production. In this formula Y represents a carbonyl (CO), hydroxymethylene (CHOH), or lower alkanoyloxymethylene (CHO-lower alkanoyl) group; A represents a double bond when Y is a carbonyl group and a single bond when Y is a hydroxymethylene or lower alkanoyloxymethylene group; B represents a single bond when Y is a carbonyl group and a double bond when Y is a hydroxymethylene or lower alkanoyloxymethylene group; and Z represents a methylene, carbonyl or hydroxymethylene group.

In accordance with the invention compounds of the foregoing formula can be produced by reacting a 16α,17α-[3,1-(1-pyrazolino)]-21-diazopregnen-20-one compound of the formula

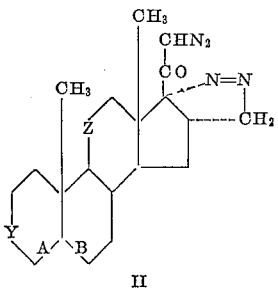

II or a 16α,17α-[3,1-(2-pyrazolino)]-21-diazopregnen-20-one compound of the formula

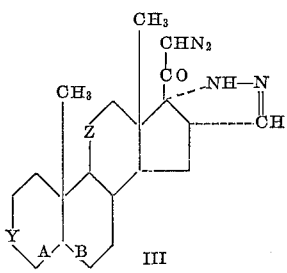

III with an acid; where Y, A, B and Z are as defined before. The acid employed is preferably a lower alkanoic acid such as acetic or propionic acid, but a variety of other acids such as hydriodic acid, hydrochloric acid and phosphoric acid can also be used. In a preferred method of carrying out the process a starting material wherein Y is a lower alkanoyloxymethylene group is heated with an excess of acetic acid for up to an hour at about 100° C. or at the boiling point of the mixture. The process can also be carried out at much lower temperatures by using a longer reaction time.

The 16α,17α-[3,1-(1-pyrazolino)]-21-diazopregnen-20-one compounds of the foregoing Formula II which are the preferred starting materials in this process can be prepared by reacting a 16-pregnen-20-one compound with pyridine and iodine to obtain the 16-pregnen-20-one-21-pyridinium iodide, reacting with sodium hydroxide and then with acid to obtain the etiochol-16-enic acid, protecting free hydroxyl groups elsewhere in the molecule by esterification with acetic anhydride, converting the etiochol-16-enic acid derivative to the acid chloride by reacting with thionyl chloride, and reacting with diazomethane to obtain the 16α,17α-[3,1-(1-pyrazolino)]-21-diazopregnen-20-one compound. This can be converted to the isomeric 16α,17α-[3,1-(2-pyrazolino)]-21-diazopregnen-20-one compound, also useful as a starting material, by isomerization, as by treatment with base. Under certain reaction conditions the 1-pyrazolino and 2-pyrazolino compounds may exist in equilibrium amounts or may be interconvertible and hence are regarded as equivalents in the practice of the invention.

Also in accordance with the invention 16α,17α,21-[3,1,1-(2-pyrazolino)]-4-pregnene-3,20-dione compounds of the foregoing Formula I where Y is a carbonyl group, A is a double bond and B is a single bond can be produced by reacting 3-hydroxy-16α,17α,21-[3,1,1-(2-pyrazolino)]-5-pregnen-20-one compounds of the foregoing Formula I where Y is a hydroxymethylene group, A is a single bond and B is a double bond with an oxidizing agent. The preferred oxidizing agent is a mixture of an aluminum alkoxide such as the ethoxide, isopropoxide or tertiary butoxide and a lower aliphatic or cycloaliphatic ketone such as acetone, methyl ethyl ketone or cyclohexanone. For reasons of economy and good yields, it is preferred to use an excess of the aluminum alkoxide and the ketone. When using such reagents the reaction is preferably carried out by heating the reactants, optionally in the presence of an unreactive solvent such as benzene, toluene or xylene, at the reflux temperature for from 5 minutes to 2 hours followed by hydrolyzing the reaction product with an aqueous reagent capable of destroying the aluminum complex. Preferred reagents for this purpose are hydrochloric acid or sodium potassium tartrate.

Further in accordance with the invention 11-hydroxy-16α,17α,21-[3,1,1-(2-pyrazolino)]-4-pregnene-3,20-dione compounds of the foregoing Formula I wherein Y is a carbonyl group, A is a double bond, B is a single bond and Z is a hydroxymethylene group are prepared by the microbiological oxidation of 16α,17α,21-[3,1,1-(2-pyrazolino)]-4-pregnene-3,20-dione of the foregoing Formula I wherein Y is a carbonyl group, A is a double bond, B is a single bond and Z is a methylene group. Compounds of the invention having an 11β-hydroxyl group can be produced by fermentation of the corresponding unsubstituted compound with an organism of the genera Curvularia, Cunninghamella, or others capable of causing 11β-hydroxylation. Compounds of the invention having an 11α-hydroxyl group can be produced by fermentation of the corresponding unsubstituted compound with an organism of the genera Rhizopus, Aspergillus, or others capable of causing 11α-hydroxylation. Other microbiological oxidizing means such as enzymatic oxidation can also be used.

Further in accordance with the invention 16α,17α,21-3,1,1-(2-pyrazolino)]-4-pregnene-3,11,20-trione of the foregoing Formula I where Y is a carbonyl group, A is a double bond, B is a single bond and Z is a carbonyl group is produced by the reaction of 11-hydroxy-16α,17α,21-[3,1,1-(2-pyrazolino)]-4-pregnen-3,20-dione compounds of the foregoing Formule I where Y is a carbonyl group, A is a double bond, B is a single bond and Z is a hydroxymethylene group with an oxidizing agent. The preferred oxidizing reagents for this purpose are oxidizing compounds of chromium or manganese, a typical oxidizing agent of this class being chromium trioxide. This reaction is preferably carried out with calculated quantity or up to a moderate excess of the oxidizing agent at 0–50° C. in an aqueous lower alkanoic acid. Depending on the temperature of the reaction mixture, the oxidation is substantially complete within from 5 minutes to 3 hours.

Still further in accordance with the invention 11-hydroxy-16α,17α,21-[3,1,1-(2-pyrazolino)]-4-pregnene-3,20-dione compounds of the foregoing Forumla I wherein Y is a carbonyl group, A is a double bond, B is a single bond and Z is a hydroxymethylene group are produced from 16α,17α,21-[3,1,1-(2-pyrazolino)]-4-pregnene-3,11,20-trione of the foregoing Formula I where Y is a carbonyl group, A is a double bond, B is a single bond and Z is a carbonyl group by protecting the carbonyl groups at positions 3 and 20, reacting with a reducing agent and regenerating the carbonyl groups at positions 3 and 20. The carbonyl groups at positions 3 and 20 can be protected by reaction with any of a variety of hydrazine derivatives used for blocking carbonyl groups. The preferred method is reaction with semicarbazide hydrochloride to form the 3,20-bis semicarbazone. The reducing agent employed should be one capable of reducing the carbonyl group at position 11 to a hydroxymethylene group. It is preferred to use a hydride reducing agent such as potassium borohydride or sodium borohydride in which case the calculated amount or up to a moderate excess of the reducing agent is reacted with the 3,20-bis semicarbazone by heating the reactants in an unreactive solvent at 25–100° C. for from 1 to 8 hour. The carbonyl groups at positions 3 and 20 are then regenerated by such means as heating the product with a mixture of acetic acid, water, pyruvic acid, sodium acetate and tetrahydrofuran.

Also in accordance with the invention 3-hydroxy-16α,17α,21-[3,1,1-(2-pyrazolino)]-5-pregnen-20-one compounds of the foregoing Formula I where Y is a hydroxymethylene group, A is a single bond, B is a double bond and Z is a methylene, carbonyl or hydroxymethylene group can be produced by reacting 3-lower alkanoyloxy-16α,17α,21-[3,1,1-(2-pyrazolino)]-5-pregnen-20-one compounds of the foregoing Formula I where Y is a lower alkanoyloxymethylene group, A is a single bond, B is a double bond and Z is a methylene, carbonyl or hydroxymethylene group with a hydrolytic agent. The hydrolytic agent is an aqueous acid or an aqueous base and the reaction is carried out by heating the reactants at 25–100° C. for up to about 4 hours. The preferred method of carrying out the reaction is to heat the steroidal starting material with sodium hydroxide or potassium hydroxide in aqueous methanol and to isolate the product after treatment with acid to destroy any hemiketal which may form by reaction of a carbonyl group with the methanol.

The compounds of the invention possess hormonal and antihormonal activities and are useful as chemical intermediates in the production of other steroids having fused heterocyclic rings. The compounds of the invention exhibit hypotensive and diuretic activity and are useful in blocking the action of aldosterone. The preferred diuretic agent is 3β-hydroxy-16α,17α,21-[3,1,1-(2-pyrazolino)]-5-pregnen-20-one which is effective in increasing sodium excretion as well as urine volume. The preferred antialdosterone compound is 16α,17α,21-[3,1,1-(2-pyrazolino)]-4-pregnene-3,20-dione which inhibits the sodium-retaining properties of aldosterone. The compounds are effective on either oral or parenteral administration.

The invention is illustrated but not limited by the following examples.

Example 1

A solution of 26.5 g. of 3β-acetoxy-16α,17α-[3,1-(1-pyrazolino)]-21-diazo-5-pregnen-20-one in 120 ml. of acetic acid is heated at 90–100° C. for 30 minutes and then boiled under reflux for 3 minutes. The solution is cooled and diluted with water and the insoluble product which separates is collected on a filter. This product is 3β-acetoxy-16α,17α,21-[3,1,1-(2-pyrazolino)]-5-pregnen-20-one; if desired it can be purified by dissolving it in a minimum amount of methylene chloride and adding about 200 ml. of methanol; M.P. 193–195° C.

The 3β-acetoxy-16α,17α-[3,1-(pyrazolino)]-21-diazo-5-pregnen-20-one used as a starting material can be obtained as follows. A solution 75 g. of 3β-hydroxy-5,16-pregnadien-20-one in 550 ml. of pyridine containing 61 g. of iodine is heated at 90–100° C. for 16 hours. The insoluble solid product, 3β-hydroxy-5,16-pregnadien-20-one-21-pyridinium iodide, is collected on a filter and washed with several small portions of 1:1 methanol-ether. An additional quantity can be obtained by diluting the filtrate with ether. A solution of 125 g. of this product in 1000 ml. of 95% ethanol containing 75 g. of sodium hydroxide and 250 ml. of water is heated at 90–100° C. for 3 hours and then refrigerated for several hours. The insoluble product, 3β-hydroxyetiochola-5,16-dienic acid sodium salt is collected on a filter and air dried. This sodium salt (70 g.) is then dissolved in 750 ml. of hot 50% ethanol and the solution is acidified with dilute hydrochloric acid. The 3β-hydroxyetiochola-5,16-dienic acid which precipitates is collected on a filter and dried in vacuo. This acid (57 g.) is dissolved in 550 ml. acetic anhydride and the solution is refluxed for 5 hours and then evaporated to a small volume to give 3β-acetoxyetiochola-5,16-dienic acid which is collected on a filter; M.P. 259–264° C., after recrystallization from hot 50% ethanol which reacts with any anhydride present. This acid (37.6 g.) is converted to the acid chloride by heating it under reflux for 3 hours in 230 ml. of benzene containing 37 ml. of thionyl chloride. The mixture is evaporated in vacuo and excess thionyl chloride is removed by dissolving the residue in dry benzene, evaporating the solution to dryness and repeating this operation several times. The residue containing the acid chloride is dissolved in a mixture of 100 ml. of benzene and 50 ml. of ether and the solution is added with stirring to a cold solution of excess diazomethane (prepared from 120 g. of N-methylnitrosourea and 240 g. of 50% potassium hydroxide) in dry ether. The mixture is refrigerated for several hours and then filtered to give 3β-acetoxy-16α,17α-[3,1-(1-pyrazolino)]-21-diazo-5-pregnen-20-one; M.P. 165–166° C.

The production of the compounds of the invention can also be carried out by using a 16α,17α-[3,1-(2-pyrazolino)]-21-diazopregnen-20-one compound as starting material in place of the 16α,17α-[3,1-(1-pyrazolino)]-21-diazopregnen-20-one compound. A solution of 5 g. of 3β-hydroxy-16α,17α[3,1-(2-pyrazolino)]-21-diazo-5-pregnen-20-one in 40 ml. of acetic acid is heated at 90–100° C. for 30 minutes and then boiled under reflux for 3 minutes. The reaction mixture is cooled and diluted with water and the insoluble product, 3β-hydroxy-16α,17α,21-

[3,1,1-(2-pyrazolino)]-5 - pregnen - 20 - one is collected; M.P. 244–247° C.

The 3β - hydroxy-16α,17α - [3,1 - (2 - pyrazolino)]-21-diazo-5-pregnen-20-one used as a starting material can be obtained as follows. A solution of 10 g. of 3β-acetoxy-16α,17α-[3,1-(1-pyrazolino)]-21-diazo - 5 - pregnen-20-one in 500 ml. of methanol is mixed with a solution of 8 g. of potassium hydroxide in 50 ml. of 50 percent methanol and the reaction mixture is allowed to stand for 6 hours. Water (200 ml.) is added and the mixture evaporated in vacuo until an insoluble crystalline product is obtained. This product, 3β-hydroxy-16α,17α-[3,1-(2-pyrazolino)]-21-diazo-5-pregnen-20-one, is collected on a filter and washed with water; following recrystallization from methanol, it shows a decomposition point at 201° C.

Example 2

A solution of 4 g. of potassium hydroxide in 100 ml. of water is added to a solution of 10.5 g. of 3β-acetoxy-16α,17α,21-[3,1,1-(2-pyrazolino)]-pregnen-20-one in 5 liters of methanol and the reaction mixture is heated at 90–100° C. for one-half hour and then allowed to stand at 25° C. for 4 hours. The solution is evaporated to a volume of 500 ml. in vacuo at 60° C. and the insoluble product, a hemiketal of 3β-hydroxy-16α,17α,21-[3,1,1-(2-pyrazolino)]-5-pregnen-20-one, is collected on a filter and washed with a small amount of methanol; M.P. 245–250° C. The hemiketal grouping is reconverted to the ketone by dissolving 9.6 g. of the product in 100 ml. of hot acetic acid, filtering the solution, adding the filtrate to 500 ml. of water, and diluting to 1000 ml. with water. The insoluble 3β - hydroxy - 16α,17α,21-[3,1,1-(2-pyrazolino)]-5-pregnen-20-one is collected on a filter and washed with water; M.P. 244–247° C.

Example 3

A mixture of 7.4 g. of 3β-hydroxy-16α,17α,21-[3,1,1-(2-pyrazolino)]-5-pregnen-20-one, 350 ml. of cyclohexanone, 250 ml. of toluene and 15 g. of aluminum isopropoxide is heated under reflux for 45 minutes. The solution is cooled, washed with an aqueous solution of sodium potassium tartrate and then with water and evaporated in vacuo at 60° C. to a small volume. The insoluble product, 16α,17α,21-[3,1,1-(2-pyrazolino)] - 4 - pregnene-3,20-dione is collected on a filter. For further purification the compound can be passed through an alumina chromatography column, developed with petroleum ether and methylene chloride; M.P. 188–191° C.

A solution of 1 g. of 16α,17α,21 - [3,1,1 - (2-pyrazolino)]-4-pregnene-3,20-dione in 25 ml. of methanol is heated with 0.5 ml. of pyrrolidine for 10 minutes at 90–100° C. The mixture is cooled and the insoluble product is collected on a filter and washed with cold methanol; 3-(1-pyrrolidyl)-16α,17α,21-[3,1,1-(2-pyrazolino)]-3,5-pregnadien-20-one, M.P. 210–215° C.

Example 4

A nutrient medium having the following composition is prepared:

| | Grams |
|---|---|
| Malt extract | 50 |
| Sucrose | 30 |
| Sodium nitrate | 2 |
| Potassium chloride | 0.5 |
| Magnesium sulfate heptahydrate | 0.5 |
| Ferrous sulfate heptahydrate | 0.01 |
| Potassium monohydrogen phosphate | 1.0 |
| Water to make 600 ml. | |

This medium is adjusted to pH 6.5 and inoculated with a spore suspension of Rhizopus nigricans corresponding to NRRL 1478. The inoculated medium is incubated at 25° C. for 72 hours on a rotary shaker operated at 240 r.p.m. Three percent by volume of this vegetative culture is used to inoculate each of 24 flasks containing 600 ml. of the medium and the flasks are incubated on the shaker for 48 hours. To each flask is then added 300 mg. of 16α,17α,21 - [3,1,1 - (2 - pyrazolino)]-4-pregnene-3,20-dione in 7.5 ml. of acetone and incubation is continued on the shaker for 72 hours at 25° C. The cultures are extracted three times with one-half their volume of ethyl acetate and the ethyl acetate solutions are combined and evaporated in vacuo at 60° C. to a small volume. The residue is dissolved in 50 ml. of methylene chloride and the solution is diluted slowly with small portions of dry ether. A tarry fraction which separates first is removed and upon further dilution with ether a crystalline solid, 11α-hydroxy-16α,17α,21-[3,1,1-(2-pyrazolino)]-4-pregnene-3,20-dione separates and is collected on a filter. A further quantity of the same product can be obtained by chromatography of the tarry fraction on an alumina column, M.P. 245–247° C.

Example 5

Three 100 ml. portions of the nutrient medium described in Example 4 are inoculated with an aqueous spore suspension of Curvularia lunata corresponding to NRRL 2380 and incubated for 72 hours at 27° C. on a rotary shaker operated at 240 r.p.m. Eight 600 ml. portions of the same nutrient medium are prepared and inoculated with 3% by volume of the vegetative culture produced by the 72 hour incubation and are then incubated for 48 hours at 27° C. on the rotary shaker. To each of the flasks is then added 300 mg. of 16α,17α,21-[3,1,1-(2-pyrazolino)]-4-pregnene-3,20-dione dissolved in 7.5 ml. of acetone and incubation is continued on the shaker for an additional 24 hours. The culture is extracted three times with one-half volume of methylene chloride and the combined extracts are concentrated to dryness in vacuo to give a residue of crude 11β - hydroxy-16α,17α,21-[3,1,1-(2-pyrazolino)]-4-pregnene-3,20-dione. For further purification the product is adsorbed on an alumina column and eluted fractionally with mixtures of ether and methylene chloride. The desired product can be eluted with 3:2 ether-methylene chloride; M.P. 255–258° C.

Example 6

A cold solution of 2 g. of 11α-hydroxy-16α,17α,21-3,1,1-(2-pyrazolino)]-4-pregnene-3,20-dione in 30 ml. of acetic acid is mixed with a cold solution of 750 mg. of chromium trioxide in 5 ml. of water and 15 ml. of acetic acid. The mixture is maintained in an ice bath for 10 minutes and then allowed to stand at 25° C. for 3 hours. The mixture is then partitioned between 500 ml. of water and 500 ml. of ethyl acetate and the aqueous phase is made slightly alkaline with sodium hydroxide while cooling with ice. The ethyl acetate phase is separated and the aqueous phase extracted with 1:1 ether-ethyl acetate. The combined organic extracts are washed with water, dried over magnesium sulfate and evaporated to give a residue of 16α,17α,21-[3,1,1-(2-pyrazolino)]-4-pregnene-3,11,20-trione; M.P. 230–233° C. after crystallization from methylene chloride-ether or chromatographic fractionation on alumina.

A mixture of 150 mg. of 16α,17α,21-[3,1,1-(2-pyrazolino]-4-pregnene-3,11,20-trione, 200 mg. of pyrrolidine and 5 ml. of methanol is heated at 90–100° C. for 15 minutes. The mixture is cooled and the insoluble product, 3-(1-pyrrolidyl)-16α,17α,21-[3,1,1-(2-pyrazolino)]-3,5-pregnadiene-11,20-dione, is collected on a filter and washed with cold methanol; does not melt below 300° C.

A mixture of 500 mg. of 16α,17α,21-[3,1,1-(2-pyrazolino)]-4-pregnene-3,11,20-trione, 10 ml. of ethylene glycol, 65 ml. of benzene and 50 mg. of p-toluenesulfonic acid is heated under reflux for 6 hours. The solution is cooled, made alkaline with 20% sodium hydroxide solution and extracted with 50 ml. of methylene chloride and 50 ml. of ether. The organic phase is separated, washed with water, dried and evaporated to give a residue of the ketal, 3-ethylenedioxy-16α,17α,21-[3,1,1-(2-pyrazolino)]-5-pregnene-11,20-dione; M.P. 238–240° C. after purification by chromatography on an alumina column.

*Example 7*

A mixture of 500 mg. of 16α,17α,21-[3,1,1-(2-pyrazolino)]-4-pregnene-3,11,20-trione, 1.0 g. of semicarbazide hydrochloride, 750 ml. of pyridine, 5 ml. of water and 30 ml. of methanol are heated under reflux for 18 hours. The solution is concentrated to one-half of its original volume and then slowly diluted with water. The insoluble 3,20-bis semicarbazone which separates is collected on a filter, washed with water and dried in vacuo; M.P. above 200° C. A solution of 620 mg. of this product in 18 ml. of tetrahydrofuran and 9 ml. of water is treated with 400 mg. of potassium borohydride. The mixture is stirred at 25° C. for one-half hour and then heated under reflux for 5 hours. An additional 100 mg. of potassium borohydride is added and heating continued for 2 more hours. The solution is cooled, acidified with 5 ml. of acetic acid, concentrated in vacuo and diluted with water until separation of the crude 11β-hydroxy-16α,17α,21-[3,1,1-(2-pyrazolino)]-4-pregnene-3,20-dione 3,20-bis semicarbazone is complete. This product is collected on a filter and then hydrolyzed by heating it under reflux for 6 hours with 7.5 ml. acetic acid, 2.5 ml. water, 1.5 ml. pyruvic acid, 1.0 g. sodium acetate and 5 ml. tetrahydrofuran. The mixture is evaporated to dryness at 60° C. in vacuo. The residue is stirred with water and the insoluble fraction is collected on a filter, washed with water and dried; 11β-hydroxy-16α,17α,21-[3,1,1-(2-pyrazolino)]-4-pregnene-3,20-dione, M.P. 255–258° C. following adsorption on an alumina column and elution with 3:2 ether methylene chloride.

We claim:
1. A compound of the formula

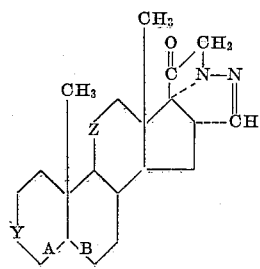

wherein Y is a member of the class consisting of carbonyl, hydroxymethylene and lower alkanoyloxymethylene groups; A and B are members of the class consisting of double bonds and single bonds; Y, A and B are selected to constitute one of the combinations Y=carbonyl
A=double bond
B=single bond, Y=hydroxymethylene
A=single bond
B=double bond, Y=lower alkanoyloxymethylene
A=single bond
B=double bond;

and Z is a member of the class consisting of methylene, carbonyl and hydroxymethylene groups.

2. 3β-hydroxy-16α,17α,21-[3,1,1-(pyrazolino)]-5-pregnen-20-one.

3. 16α,17α,21-[3,1,1-(2-pyrazolino)]-4-pregnene-3,20-dione.

4. 11α-hydroxy-16α,17α,21-[3,1,1-(2-pyrazolino)]-4-pregnene-3,20-dione.

5. 11β-hydroxy-16α,17α,21-[3,1,1-(2-pyrazolino)]-4-pregnene-3,20-dione.

6. 16α,17α,21-[3,1,1-(2-pyrazolino)]-4-pregnene-3,11,20-trione.

7. Process for the production of compounds of the formula

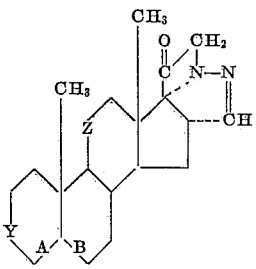

which comprises reacting a member of the class consisting of compounds of the formula

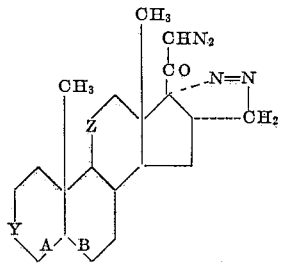

and compounds of the formula

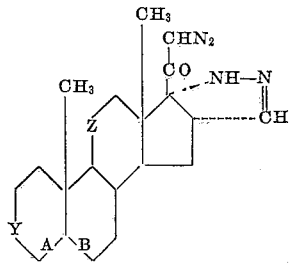

with a lower alkanoic acid; wherein Y is a member of the class consisting of carbonyl, hydroxymethylene and lower alkanoyloxymethylene groups; A and B are members of the class consisting of double bonds and single bonds; Y, A and B are selected to constitute one of the combinations Y=carbonyl
A=double bond
B=single bond, Y=hydroxymethylene
A=single bond
B=double bond, Y=lower alkanoyloxymethylene
A=single bond
B=double bond;

and Z is a member of the class consisting of methylene, carbonyl and hydroxymethylene groups.

8. Process according to claim 7 wherein the lower alkanoic acid is acetic acid.

References Cited in the file of this patent
UNITED STATES PATENTS

| | | |
|---|---|---|
| 2,702,291 | Sondheimer et al. | Feb. 15, 1955 |
| 2,775,603 | Sheehan | Dec. 25, 1956 |
| 2,844,513 | Wettstein et al. | July 22, 1958 |

OTHER REFERENCES

Lowenthal: Tetrahedron 6, 269–303 (June 1959) (page 297 relied on).

Fieser et al.: "Steroids," Rheinhold Publishing Corp., New York (1959), pages 483 and 543.